United States Patent
Fontana et al.

(10) Patent No.: US 6,616,465 B1
(45) Date of Patent: Sep. 9, 2003

(54) BUS BAR FOR ELECTRICAL POWER DISTRIBUTION

(75) Inventors: Rodolfo Fontana, Clivio (IT); Alessandro Leone, Seregno (IT)

(73) Assignee: ABB Service S.r.l., Milan (IT)

( * ) Notice: Subject to any disclaimer, the term of this patent is extended or adjusted under 35 U.S.C. 154(b) by 0 days.

(21) Appl. No.: 09/830,294

(22) PCT Filed: Oct. 25, 1999

(86) PCT No.: PCT/EP99/08154
§ 371 (c)(1),
(2), (4) Date: Jun. 12, 2001

(87) PCT Pub. No.: WO00/27007
PCT Pub. Date: May 11, 2000

(30) Foreign Application Priority Data

Oct. 30, 1998 (IT) .......................................... MI98A2347

(51) Int. Cl.⁷ .............................................. H01R 25/00
(52) U.S. Cl. .................... 439/110; 439/115; 174/99 B; 174/68.2; 403/408.1
(58) Field of Search .................... 439/110, 115, 439/114, 212; 174/126, 100, 171, 70, 99 B, 68.2; 403/256, 257, 408.1; 411/84, 85, 98, 104, 970, 999

(56) References Cited

U.S. PATENT DOCUMENTS

| | | | |
|---|---|---|---|
| 1,574,993 A | | 3/1926 | Miner .................... 174/129 B |
| 2,138,617 A | | 11/1938 | Scott ...................... 174/129 B |
| 2,904,621 A | * | 9/1959 | Grier .......................... 174/126 |
| 3,933,403 A | * | 1/1976 | Rubesamen et al. ........ 439/110 |
| 4,775,259 A | * | 10/1988 | Shell .......................... 403/252 |
| 4,932,808 A | * | 6/1990 | Bar et al. .................... 403/217 |
| 5,101,080 A | * | 3/1992 | Ferenc ........................ 439/110 |
| 5,259,774 A | * | 11/1993 | Gabrius ...................... 439/110 |
| 5,779,412 A | * | 7/1998 | Nagai et al. .................. 411/85 |
| 5,785,359 A | * | 7/1998 | Nagai et al. ................ 403/255 |
| 5,847,321 A | * | 12/1998 | Carle et al. ................ 174/68.2 |
| 6,039,584 A | * | 3/2000 | Ross .......................... 439/115 |

FOREIGN PATENT DOCUMENTS

| | | |
|---|---|---|
| DE | A-195 03 560 | 8/1996 |
| EP | A-0 381 923 | 8/1990 |

* cited by examiner

*Primary Examiner*—P. Austin Bradley
*Assistant Examiner*—Briggitte Hammond
(74) *Attorney, Agent, or Firm*—Guido Modiano; Albert Josif; Daniel O'Byrne

(57) ABSTRACT

A bus bar for electric power distribution, comprising a body made of conducting material, the body having, on at least one side, at least one slot which has a C-shaped cross-section, the back wall of said C-shaped slot comprising two substantially straight portions which form an angle of less than 180° between them.

10 Claims, 3 Drawing Sheets

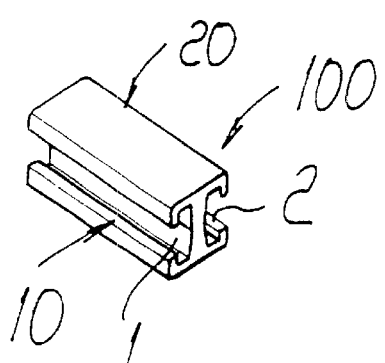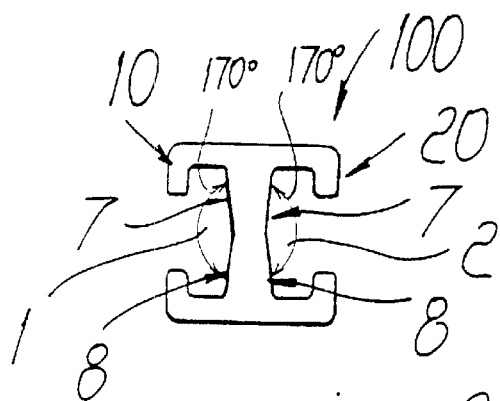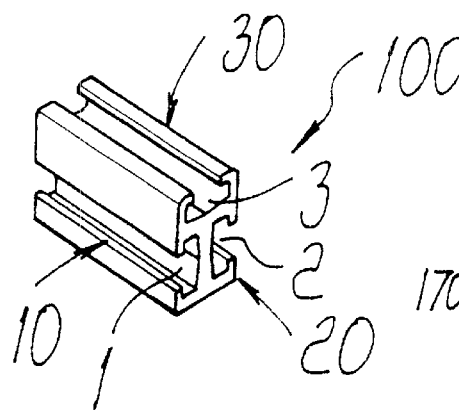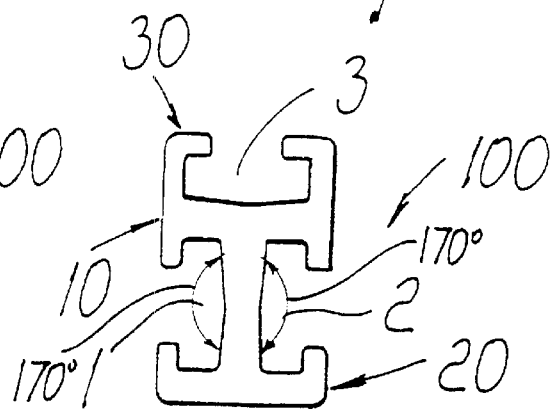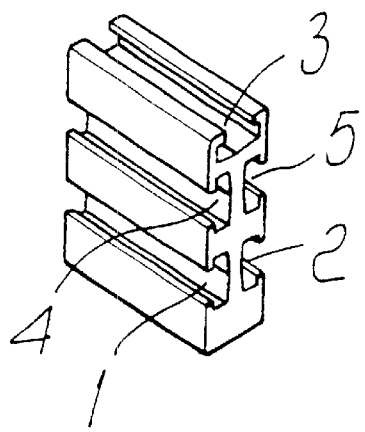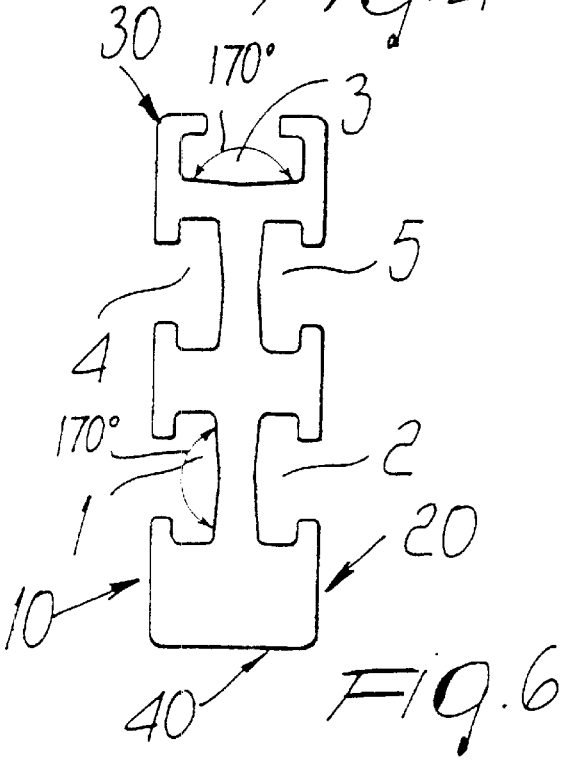

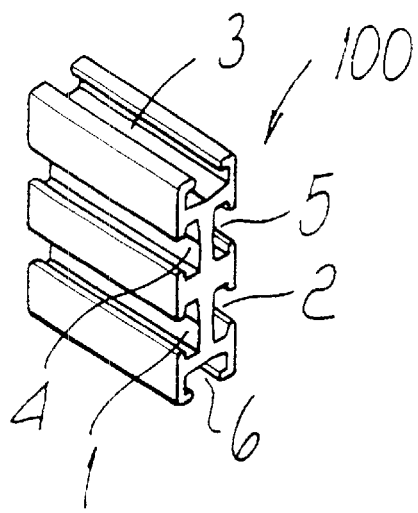
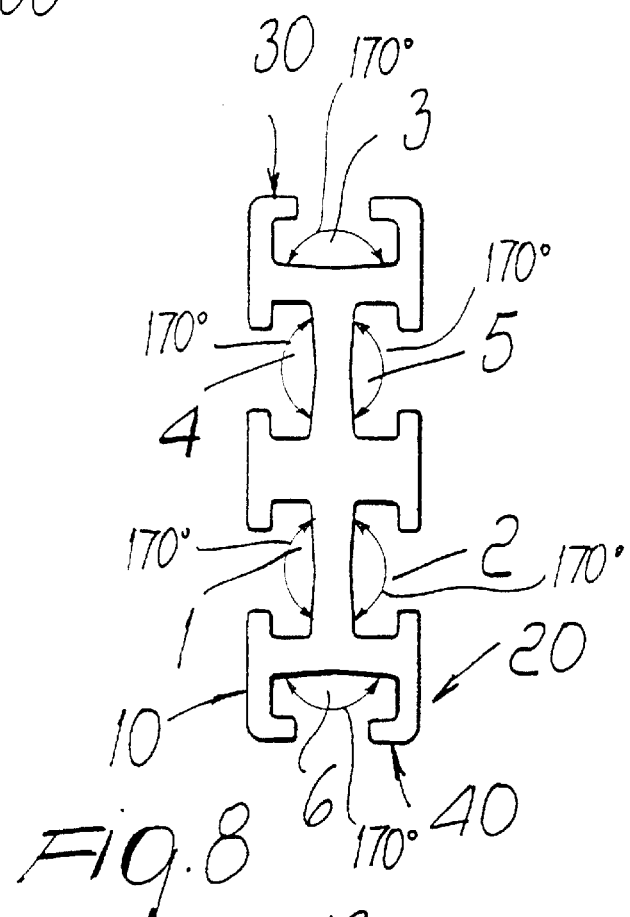
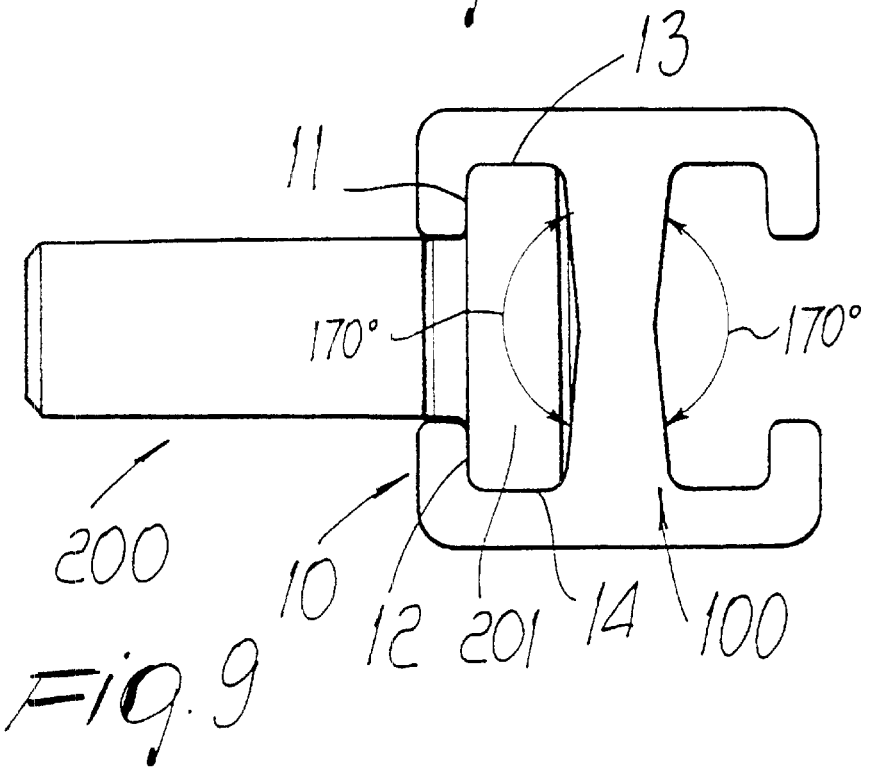

BUS BAR FOR ELECTRICAL POWER DISTRIBUTION

BACKGROUND OF THE INVENTION

The present invention relates to a bus bar for electrical power distribution having improved shape and characteristics.

More particularly, the bus bar according to the invention has a structure with a modular geometry in which the basic geometric element can be easily adopted to provide bus bars sized to carry nominal currents having different amperages; moreover, the bus bar according to the invention is unique in its simplicity both from the point of view of production and in practical use, allowing to considerably simplify assembly.

It is known that distribution switchboards for distributing electric power to a plurality of electrical devices, such as for example circuit breakers, use a system of mutually parallel bus bars.

Each one of the bars is connected to a corresponding polarity of the electric power supply mains; the connection between the bus bars and the devices is provided by means of adapted conductors, such as for example laminae, which are shaped appropriately according to the type of device.

Bus bars, according to the functions that they are required to perform in the practical application, must have a few basic characteristics; in particular, they must have a simple and functional constructive structure which allows extreme flexibility in assembly and coupling to other conducting or insulating elements. Said constructive structure must also be conceived so that it can be easily adopted to produce bars that conduct nominal currents with different amperages, without having to significantly modify the steps of the production of said bars or of the elements to which they are to be coupled.

It is also important for the bars to have a structure which on the one hand ensures the rigidity required to withstand the electrodynamic stresses produced by the flow of current during normal conduction and on the other hand allows to optimize the amount of material used in production, so as to achieve an economic benefit.

In the current state of the art, the use of conventional bus bars has drawbacks which make them less than satisfactory from the point of view of production and in practical use.

It is traditionally known to use flat bars with a solid rectangular transverse cross-section; although these bars are extremely simple from the point of view of production, they have considerable disadvantages in coupling to other elements, such as for example additional bars. Such cases in fact require bar drilling operations, which vary in each instance according to the coupling configuration to be obtained, and the adoption of particular connecting means which are appropriately shaped. An example in this regard is shown in U.S. Pat. No. 5,364,203.

It is also known in the art to use bus bars whose transverse cross-sections are shaped so as to facilitate coupling to other bars or to supporting and/or insulation elements; these elements are meant to fix the bars to supporting structures and to assist them in withstanding the electrodynamic stresses. One of the shortcomings of conventional shaped bars is the fact that as the amperage level of the nominal currents to be carried rises, the constructive structure of the bars is considerably modified; this in particular leads to the need to correspondingly modify the supporting and/or insulation elements that couple to the bars. Moreover, coupling between bars is provided by means of conventional devices, for example connecting devices, which require the use of fixing means, typically T-shaped bolts. Said screws have a shaped head which, during assembly, is inserted in one of the slots of the bar and geometrically couples to the walls of said slot; however, this operation is difficult, because the screw does not stay in position but tends to fall, and therefore requires particular care on the part of the operator. In order to obviate this drawback, the solution used most commonly in the art is to associate with the head of the screw an adapted spring, for example a leaf spring, which is welded onto the head or otherwise locked onto the screw; although this solution is effective for the screw-bar coupling, it is disadvantageous because it requires an additional constructive component and has a negative effect on costs.

SUMMARY OF THE INVENTION

The aim of the present invention is to provide a bus bar for electrical power distribution whose structure has a modular geometry in which the basic geometric element can be easily adopted with bars sized for nominal currents of different amperage, for example 400A rather than 1600A, without significantly modifying the steps of the production of the bars or of the insulating and/or supporting elements that will be coupled to them, thus allowing advantageous economies of scale.

Within the scope of this aim, an object of the present invention is to provide a bus bar for electric power distribution whose constructive structure allows extreme flexibility and ease of execution in assembly.

Another object of the present invention is to provide a bus bar for electric power distribution whose structure is provided by using an optimum amount of material and at the same time has the rigidity sufficient to withstand the electrodynamic stresses to which it is subjected during normal operation.

Another object of the present invention is to provide a bus bar for electric power distribution which is highly reliable, relatively easy to manufacture and at competitive costs.

This aim, these objects and others which will become apparent hereinafter are achieved by a bus bar for electric power distribution, comprising a body made of conducting material, characterized in that said body has, on at least one side, at least one slot having a C-shaped cross-section, the back wall of said C-shaped slot comprising two substantially straight portions which form an angle of less than 180° between them.

The bus bar according to the invention has the advantage of having a structure with a modular geometry whose basic geometric element is suitable to be easily implemented in the production of bus bars sized for nominal currents of different amperage, for example 400 A, 600 A, 1000 A, 1600 A or others, without significantly modifying the steps of the production of the bars or of the supporting and/or insulation elements to which said bus bars couple.

BRIEF DESCRIPTION OF THE DRAWINGS

Further characteristics and advantages of the present invention will become apparent from the following detailed description of preferred but not exclusive embodiments of the bar according to the invention, illustrated by way of non-limitative example in the accompanying drawings, wherein:

FIG. 1 is a perspective view of a first embodiment of the bus bar according to the invention;

FIG. 2 is a plan view of the bar of FIG. 1;

FIG. 3 is a perspective view of a second embodiment of the bar according to the invention;

FIG. 4 is a plan view of the bar of FIG. 3;

FIG. 5 is a perspective view of a third embodiment of the bar according to the invention;

FIG. 6 is a plan view of the bar of FIG. 5;

FIG. 7 is a perspective view of a fourth embodiment of the bar according to the invention;

FIG. 8 is a plan view of the bar of FIG. 7;

FIG. 9 is a view of a bus bar according to the invention, coupled with a suitably configured T-shaped bolt.

In the following description, identical reference numerals designate identical or technically equivalent elements.

DESCRIPTION OF THE PREFERRED EMBODIMENTS

Figure 10:
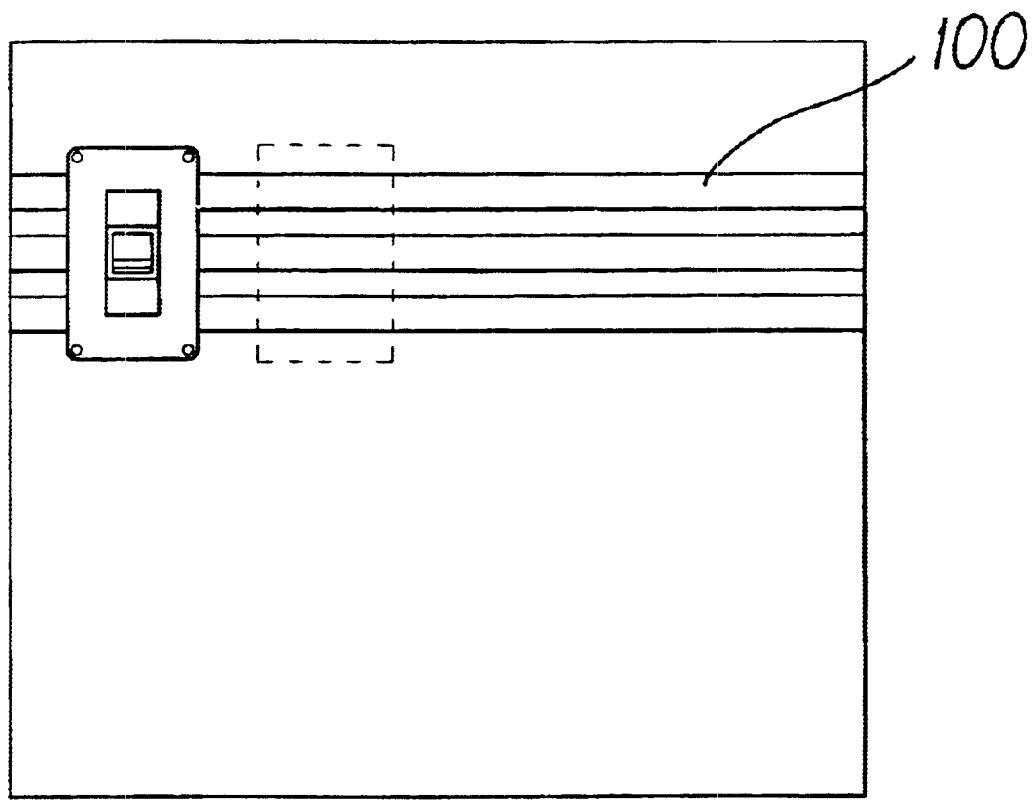
FIG. 10 is a view of switchboard using the bus bar according to the invention.

With reference to the above figures, the bus bar for electric power distribution according to the invention comprises a body 100 made of conducting material, for example copper, which preferably has a substantially quadrangular transverse cross-section. In particular, as shown in FIGS. 1–9, the body 100 has a rectangular transverse cross-section; likewise, and in a fully equivalent manner, the transverse cross-section might be square or trapezoidal or may have any other shape, provided that it is adapted for the application.

As shown in detail in FIGS. 1 and 2, the body 100 has, on at least one side, at least one slot having a C-shaped cross-section. More preferably, the body 100 has two C-shaped slots: a first slot 1, formed on a first side 10 of the body 100, and a second slot 2, formed on a second side 20 of said body. The two sides 10 and 20 are also substantially parallel to each other. Advantageously, the back wall of each one of the slots 1 and 2 comprises two substantially straight portions 7 and 8 which form an angle of less than 180° between them. In particular, the two portions 7 and 8 form between them an angle of 155° to 178°, preferably 160° to 175°, more preferably 165° to 172°. In the embodiments illustrated in FIGS. 1 to 8, the angle shown is of approximately 170°.

Therefore, the bar has a structure with a modular geometry in which the basic geometric element, constituted by a C-shaped slot, can be easily implemented and replicated in the construction of bus bars sized to carry nominal currents of different amperage. An example in this regard is shown in FIGS. 3 and 4, where three C-shaped slots are formed in the body 100 of the bar: a first slot 1 and a second slot 2 are formed on two sides of the body 100, respectively 10 and 20, which are substantially parallel to each other, and a third slot 3 is instead formed along a third side 30 of the body which is substantially perpendicular to the two sides 10 and 20. Said bus bar is preferably adapted to carry nominal currents of 600 A, whereas the bus bar shown in FIGS. 1 and 2 is particularly adapted for conducting nominal currents of 400 A.

Another possible embodiment of the bus bar according to the invention is shown in FIGS. 5 and 6, where on the body 100 there are five C-shaped slots: a first slot 1 and a second slot 4 are formed along a first side 10 of the body and a third slot 2 and a fourth slot 5 are formed along a second side 20 which is substantially parallel to the side 10. The fifth slot 3 is formed on a third side 30 which is substantially perpendicular to the sides 10 and 20. Said bar is particularly adapted for carrying nominal currents of 1600 A.

Yet another embodiment of the bus bar according to the invention, suitable for carrying nominal currents of 1000 A, is shown in FIGS. 7 and 8. In this embodiment, the body 100 has six C-shaped slots: a first slot 1 and a second slot 4 are formed along a first side 10 of the body 100, a third slot 2 and a fourth slot 5 are formed along a second side 20 of the body, with the sides 10 and 20 substantially parallel to each other, and a fifth slot 3 and a sixth slot 6 are instead formed on a third side 30 and on a fourth side 40 respectively. The sides 30 and 40 are substantially parallel to each other and substantially perpendicular to the sides 10 and 20.

Another advantageous aspect to be noted is the fact that when the bus bars are connected to each other or to other coupling elements by way of adapted connection and fixing means, the adoption of the C-shaped slot thus configured allows to simplify coupling and assembly. In particular, the bus bar according to the invention significantly facilitates connections by means of T-shaped bolts. As shown in FIG. 9, when the bar is coupled with a T-shaped bolt, generally designated by the reference numeral 200, the coupling between the two parts occurs mainly by means of the interference that occurs between the two inclined planes 7 and 8 that form the back wall of the C-shaped slot and the head plane 201 of the T-shaped bolt. Moreover, practical tests have shown that, though the extreme simplicity of this coupling, the interference between the walls 7 and 8 and the head 201, assisted by the side contact that the internal walls 11 and 12 of the slot give to the base of the head, is efficient to the point of allowing to place and automatically lock the bolt in the chosen position simply by way of its manual insertion and without using additional springs. Any further interference that occurs between the internal side walls 13 and 14 of the C-shaped slot and the corresponding surfaces of the head of the screw merely increases the effectiveness of the coupling.

In practice it has been observed that the bus bar according to the invention fully achieves the intended aim and objects, since it has a modular structure with a basic geometric element which is adapted to be used to form bus bars sized for nominal currents of different amperage. Moreover, said structure, by way of the use of the slots configured as described, facilitates assembly and allows to optimize the amount of material used while maintaining the structural rigidity characteristics of said bar. The bar thus conceived, by way of its innovative characteristics, is particularly adapted for use in distribution switchboards for low-voltage applications. Such switchboards comprise a plurality of electrical devices, such as circuit breakers and the like, which are electrically connected to corresponding bus bars, at least one of which can be provided according to one of the above-described embodiments.

The bus bar thus conceived is susceptible of numerous modifications and variations, all of which are within the scope of the inventive concept; all the details may further be replaced with other technically equivalent elements.

In practice, the materials employed, so long as they are compatible with the specific use, as well as the dimensions, may be any according to requirements and to the state of the art.

What is claimed is:

1. A bus bar assembly system comprising a bus bar for electric power distribution, and connection and fixing means, wherein said bus bar comprises a body made of conducting material, said body having, on at least one side, at least one slot having a C-shaped cross-section, a back wall of said C-shaped slot comprising two substantially straight portions which form an angle of less than 180° between them, and wherein said connection and fixing means comprise a T-shaped bolt having a head inserted in said C-shaped slot, the coupling between said bolt and said bus bar occurring by means of the interference between the head of the bolt and the substantially straight portions of the back wall of said C-shaped slot.

2. The bus bar for electric power distribution according to claim 1, wherein said body has a substantially quadrangular transverse cross-section.

3. The bus bar according to claim 1, wherein said body has two C-shaped slots, a first slot being formed on a first side of the body, a second slot being formed on a second side of the body, the first and second sides being substantially parallel to each other.

4. The bus bar according to claim 1, wherein said body has three C-shaped slots, a first slot and a second slot being formed on two substantially parallel sides of the body, a third slot being formed along a third side of the body, said third side being substantially perpendicular to said first and second sides.

5. The bus bar according to claim 1, wherein said body has five C-shaped slots, a first slot and a second slot being formed along a first side of the body, a third slot and a fourth slot being formed along a second side of the body, said first and second sides being substantially parallel to each other, a fifth slot being formed on a third side of the body which is substantially perpendicular to said first and second sides.

6. The bus bar according to claim 1, wherein said body has six C-shaped slots, a first slot and a second slot being formed along a first side of the body, a third slot and a fourth slot being formed along a second side of the body, said first and second sides being substantially parallel to each other, a fifth slot and a sixth slot being formed respectively on a third side and on a fourth side, said third and fourth sides being substantially parallel to each other and being perpendicular to the first side and to the second side.

7. An electric power distribution switchboard comprising a plurality of electrical devices, such as circuit breakers and the like, which are electrically connected to corresponding bus bars, wherein at least one of said bus bars comprises a body made of conducting material, wherein said body has, on at least one side, at least one slot having a C-shaped cross-section, a back wall of said C-shaped slot comprising two substantially straight portions which form an angle of less than 180° between them.

8. The bus bar for electric power distribution according to claim 1, wherein said two substantially straight portions form an angle comprised between 155° and 178°.

9. The bus bar for electric power distribution according to claim 8, wherein said two substantially straight portions form an angle comprised between 160° and 175°.

10. The bus bar for electric power distribution according to claim 9, wherein said two substantially straight portions form an angle comprised between 165° and 172°.

* * * * *